United States Patent
Riise et al.

(10) Patent No.: US 8,899,422 B2
(45) Date of Patent: Dec. 2, 2014

(54) METHODS, SYSTEMS, AND DEVICES FOR ENRICHMENT OF PLASTIC MATERIALS DERIVED FROM ELECTRONICS SHREDDER RESIDUE

(75) Inventors: Brian L. Riise, San Ramon, CA (US); Martin Starchl, Molln (AT); John Gysbers, St. Augustine, FL (US)

(73) Assignee: MBA Polymers, Inc., Nottinghamshire (GB)

(*) Notice: Subject to any disclaimer, the term of this patent is extended or adjusted under 35 U.S.C. 154(b) by 0 days.

(21) Appl. No.: 13/538,362

(22) Filed: Jun. 29, 2012

(65) Prior Publication Data

US 2013/0008831 A1    Jan. 10, 2013

Related U.S. Application Data

(60) Provisional application No. 61/504,538, filed on Jul. 5, 2011.

(51) Int. Cl.

| | |
|---|---|
| *B02C 17/02* | (2006.01) |
| *B07C 5/344* | (2006.01) |
| *B29B 17/02* | (2006.01) |
| *B29K 23/00* | (2006.01) |
| *B29K 25/00* | (2006.01) |
| *B29K 55/02* | (2006.01) |
| *B29K 105/00* | (2006.01) |

(52) U.S. Cl.
CPC ......... *B07C 5/344* (2013.01); *B29B 2017/0237* (2013.01); *B29B 2017/0244* (2013.01); *B29B 17/02* (2013.01); *B29K 2023/12* (2013.01); *B29K 2025/06* (2013.01); *B29K 2055/02* (2013.01); *B29K 2105/0026* (2013.01); *B29B 2017/0203* (2013.01); *B29B 2017/0279* (2013.01)

USPC .......... 209/12.1; 209/589; 209/576; 209/552; 241/24.18; 241/24.28; 241/20

(58) Field of Classification Search
CPC ............ B29B 17/02; B29B 2017/0279; B29B 2017/0237
USPC .......... 209/12.1, 589, 576; 241/19, 20, 24.18, 241/24.28, 29
See application file for complete search history.

(56) References Cited

U.S. PATENT DOCUMENTS

| | | | | |
|---|---|---|---|---|
| 4,167,477 A | * | 9/1979 | Valdez et al. | 209/166 |
| 4,728,045 A | * | 3/1988 | Tomaszek | 241/19 |

(Continued)

FOREIGN PATENT DOCUMENTS

| | | |
|---|---|---|
| DE | 102006034692 B4 | 1/2008 |
| EP | 291959 A2 | 11/1988 |

(Continued)

OTHER PUBLICATIONS

Invitation to Pay Additional Fees; Sep. 19, 2012; World Intellectual Property Organization (WIPO) (International Bureau of); PCT/US2012/045287; 7 pages.

(Continued)

*Primary Examiner* — Luis A Gonzalez
(74) *Attorney, Agent, or Firm* — Fish & Richardson P.C.

(57) ABSTRACT

A method for separating a mixture of solid materials can includes a sorting step based on differences in X-Ray transmission of different materials and a density sorting step at an elevated density. The mixture of solid materials can be a plastic-rich mixture recovered from waste electrical and electronic equipment. The mixture of solid materials can include plastics that contain brominated flame retardants. In some cases, a XRT or DEXRT sorter is used to remove the majority of plastics that contain brominated flame retardants from the mixture.

20 Claims, 4 Drawing Sheets

(56) References Cited

U.S. PATENT DOCUMENTS

| | | | |
|---|---|---|---|
| 5,141,110 A | | 8/1992 | Trischan et al. |
| 5,653,867 A | * | 8/1997 | Jody et al. .................... 209/164 |
| 5,667,151 A | * | 9/1997 | Miura et al. .................... 241/20 |
| 5,988,395 A | * | 11/1999 | Calo et al. ........................ 209/3 |
| 6,460,788 B1 | | 10/2002 | de Feraudy |
| 6,568,612 B1 | * | 5/2003 | Aoki et al. ...................... 241/19 |
| 7,799,835 B2 | * | 9/2010 | Smith et al. ..................... 521/40 |
| 7,802,685 B2 | * | 9/2010 | Allen et al. ................. 209/12.1 |
| 8,074,908 B2 | | 12/2011 | Adamec |
| 2007/0187299 A1 | * | 8/2007 | Valerio ........................ 209/12.1 |
| 2008/0190819 A1 | * | 8/2008 | Schlummer et al. ............ 209/17 |
| 2008/0257794 A1 | * | 10/2008 | Valerio ......................... 209/567 |
| 2009/0302139 A1 | * | 12/2009 | Adamec ..................... 241/24.14 |
| 2011/0089086 A1 | | 4/2011 | Riise et al. |

FOREIGN PATENT DOCUMENTS

| | | |
|---|---|---|
| EP | 441012 A2 | 8/1991 |
| KR | 2011102952 | 9/2011 |
| TW | 200949296 | 9/2010 |
| WO | WO2008056465 A1 | 5/2008 |
| WO | 2010092645 | 8/2010 |
| WO | WO2011047280 A1 | 4/2011 |

OTHER PUBLICATIONS

International Search Report and Written Opinion; Nov. 28, 2012; World Intellectual Property Organization (WIPO) (International Bureau of); PCT/US2012/045287; 14 pages.

"Market Entry Strategies and Advice," Market Study Korea 2013, Environmental & Energy Related Technologies, p. 123.

Henkes, "Spielraum für mehr Recycling," [Scope for more recycling] Recycling Magazin vol. 22, 2011, 2 pages.

Iseki, "Environment—Green Cycle Systems: Refining Old Plastics into Industrial-grade materials," Mitsubishi Electric [online] [retrieved on May 25, 2013 and Sep. 20, 2013]. Retreived from the Internet: < URL: http://www.mitsubishielectric.com/company/environment/ecotopics/plastic_sp/greencycle/index.html>, 6 pages.

Schut, "First Commercial Recycling Process for Electronics Waste," Plastics Technology, Plastics Technology [online] May 2008, [retrieved on Sep. 20, 2013]. Retrieved from the Internet < URL: http://www.ptonline.com/articles/first-commercial-recycling-process-for-electronics-waste>, 3 pages.

van Rompacy, "Third Party Observations: Annex I," 11 pages, Jul. 16, 2013.

Waste Seperation Scheme, "Electronic Household Plastic Waste" [flow chart], Jun. 1, 2001, 2 pages.

Third Party Observation in PCT/US2012/045287, filed Sep 10, 2013, 4 pages.

* cited by examiner

METHODS, SYSTEMS, AND DEVICES FOR ENRICHMENT OF PLASTIC MATERIALS DERIVED FROM ELECTRONICS SHREDDER RESIDUE

CLAIM OF PRIORITY

This application claims priority under 35 USC §119(e) to U.S. Provisional Application Ser. No. 61/504,538, filed on Jul. 5, 2011, the entire contents of which are hereby incorporated by reference.

TECHNICAL FIELD

This disclosure relates to material separations, including recycling plastics from streams of waste plastics and other materials.

BACKGROUND

The recovery of plastics from waste streams such as durable goods is a considerable challenge due to the presence of several types of plastics as well as non-plastics contaminants. The initial stage in the plastic recovery process when the durable goods are waste electrical and electronic equipment (WEEE) is the creation of electronics shredder residue (ESR). ESR is the plastic-rich mixture available after the metal recycling company has shredded the WEEE and removed the majority of the metals from the shredded mixture. The ESR can then be processed to recover acrylonitrile-butadiene-styrene (ABS), high impact polystyrene (HIPS) and polypropylene (PP) plastics.

Metal recycling companies tend to produce smaller amounts of ESR, though, so the ESR material is often transported from several metal recyclers to a single plastics recovery and purification facility. Much of the value added at the plastics recovery and purification facility is from the purification of the ABS, HIPS and PP, so it is economically favorable if the feed to the plastics recovery and purification facility is primarily ABS, HIPS and PP.

A number of processes and process combinations may enable the creation of a mixture with a high concentration of target plastics (ABS, HIPS and PP) from ESR, but it would be beneficial to use an approach that also creates several other products that are created to maximize the overall value of all products.

SUMMARY

Methods, systems, and devices are described for the creation of a highly enriched stream of plastics suitable for recovery in a purified form (e.g., mixtures including highly enriched in ABS, HIPS and PP from ESR). One method suitable for creating a primary product rich in ABS, HIPS and PP plus several other mixtures of high overall value is a process that creates 1) one or more streams that are highly enriched in substances that are deemed to be hazardous or which can cause the stream to have a very low or negative value, 2) one or more streams containing most of the residual metal from the ESR, which can be further processed as desired to maximize the value, 3) a stream containing mixtures of non-target plastics (i.e. plastics other than ABS, HIPS and PP) that can be used for low end applications or energy recovery with few restrictions, 4) one or more mixtures of dirt, fines, foam, glass and other materials and 5) a mixture of primarily ABS, HIPS and PP suitable for further separation and purification. For example, the process can include sorting based on differences in X-Ray transmission of the materials followed by sorting based on density. Such a process might further include process steps such as screening, cleaning, air classification, size reduction, rinsing and drying.

In the following, methods, systems and devices are described for the creation of mixtures highly enriched in ABS, HIPS and PP from ESR.

DETAILED DESCRIPTION

This application describes methods, systems, and devices for separating materials recovered from electronics shredder residue (ESR), which is the plastic-rich mixture available after the metal recycling company has shredded waste electrical and electronic equipment (WEEE) and removed the majority of the metals from the shredded mixture.

ESR can contain plastics in a size range from about 3 mm to about 120 mm. For example, ESR typically contains approximately 40-50% (by weight) of one or more target plastics (e.g., ABS, HIPS and/or PP), 40-50% other plastics, 5-10% rubber, wood and other non-plastics, and less than 5% metals.

The "other plastics" category can include polycarbonate (PC), blends of PC with ABS (PC/ABS), flame retarded PC/ABS (PC/ABS-FR), flame retarded grades of ABS (ABS-FR), flame retarded grades of HIPS (HIPS-FR), blends of polyphenylene ether with HIPS (PPO), flame retarded grades of PPO (PPO-FR), polyamides (PA6 and PA66), polyacetal, polyesters (PET and PBT), polyvinyl chloride (PVC), glass filled polymers and others. ABS-FR and HIPS-FR typically contain approximately 10-20% (by weight) of brominated flame retardants plus 3-5% by weight of antimony trioxide ($Sb_2O_3$). Most of these "other plastics" materials are higher in density than a target plastic (e.g., ABS, HIPS and/or PP).

The metals fraction can include small amounts of ferrous metal, stainless steel, wires, aluminum, other metals or metal alloys, and circuit boards.

The primary product after the pre-processing sequence can be a mixture containing approximately 90% or greater of one or more target plastics (e.g., ABS, HIPS and/or PP). The product, in some embodiments, has essentially no metals (e.g., less than 0.5 weight percent) and a particle size small enough to ensure a reasonably high bulk density that is helpful for minimizing transport costs.

Another possible attribute of the plurality of products from pre-processing is the isolation of hazardous or otherwise undesirable materials into certain streams while creating other streams essentially free of these substances. For example, the process can produce a stream highly enriched in halogen-containing products (e.g., ABS-FR, HIPS-FR and/or PVC) while at the same time ensuring that the other product streams contain only small amounts of halogens.

In certain embodiments, the process can create a stream enriched in heavy metals (especially cadmium, which in the past was an element in pigments used in plastics) while ensuring that the levels of heavy metals in some of the other streams are low.

In some embodiments, the process is used to isolate the metals into a highly enriched mixture that can be further processed as desired to optimize the value, either alone or in combination with the other processes discussed above.

Figure 1:
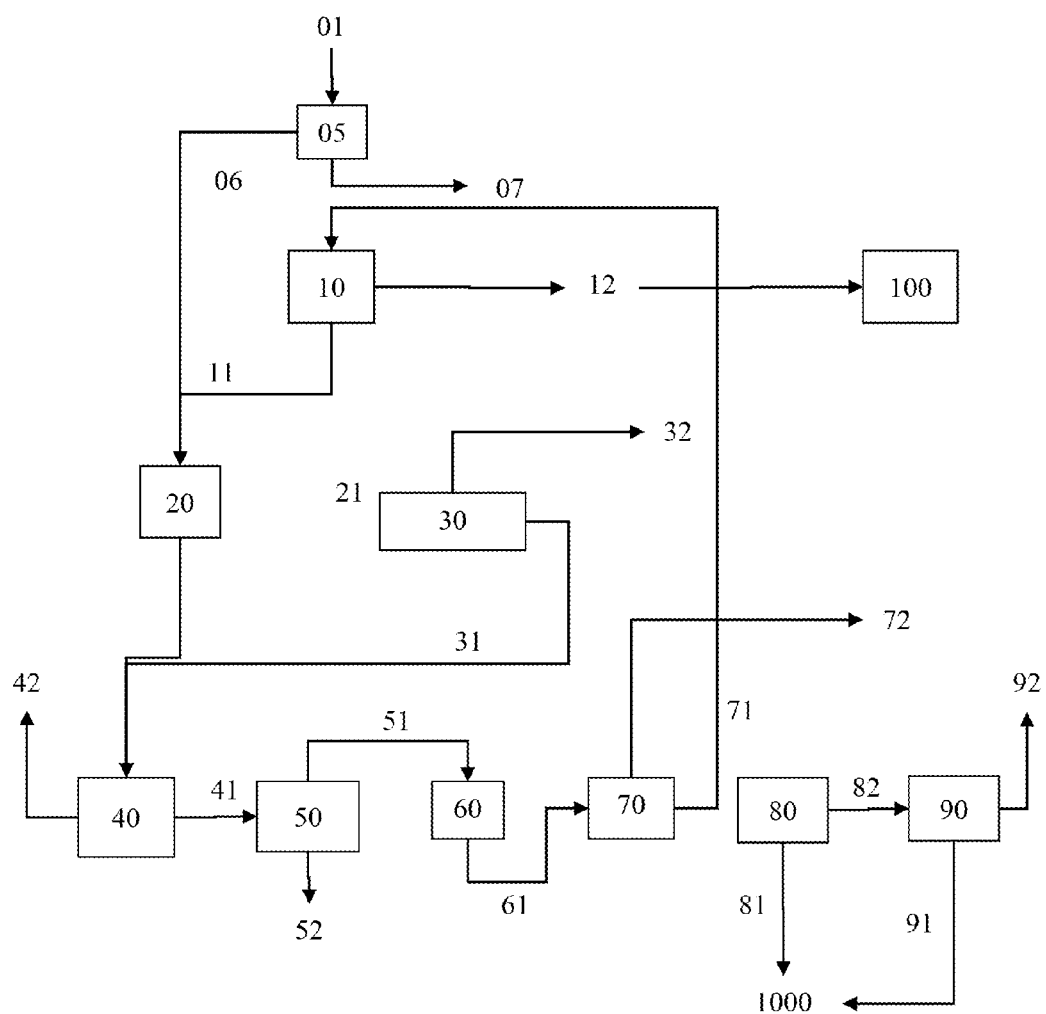
FIG. 1 shows a process to create a highly enriched stream of PP, ABS and PS as well as upgradeable streams containing metals or heavy plastics

One embodiment of the separation process is shown in FIG. 1.

As shown in FIG. 1, the first stage in the process can be a screening step (05) to remove particles smaller than about 3 to 5 mm. The particles smaller than 3 to 5 mm (07) can be further processed to recover metals, if desired. The screening can be accomplished using square holed screens such as those available from Rotex (Cincinnati, Ohio) or from Binder+Co AG (Gleisdorf, Austria). The screening step (05) is not required if earlier screening created an ESR stream (01) essentially free of particles smaller than about 3 to 5 mm.

The next stage of the process shown in FIG. 1 is a sorter (10) based on differences in X-Ray transmission of different materials in the ESR stream with fine particles removed (06). This sorter (10) can enable the detection and ejection of particles based on differences in atomic densities of the particles. With such sorters, it is possible to remove plastics containing brominated flame retardants, PVC, metal pieces, circuit boards, wires (except for small or thin wires, which may be difficult to detect or eject) stones, glass and perhaps even some rubber.

Such sorters typically include particles sitting on a conveyor belt that passes rapidly under a source of X-Rays. The transmitted intensity of X-Rays can be measured using an appropriate array of detectors located beneath the belt. The sorter can include a computer that decides which particles to eject based on the transmitted X-Ray image. For example, particles with transmitted intensities below a certain threshold are ejected using movable paddles or nozzles providing short blasts of air to alter particle trajectories.

Such sorters can include detection of a single wavelength range (XRT) or detection of two wavelengths (DEXRT). The dual energy X-Ray Transmission (DEXRT) sorter can distinguish very thick pieces with low atomic density from thin pieces with high atomic density. Plastic pieces can vary in thickness and in some cases can have "L" shaped corners which result in a longer path length for X-Rays through the particle.

XRT or DEXRT sorters can work with almost any particle size since the resolution can be as fine as a few millimeters. XRT or DEXRT sorters work efficiently with particles larger than about 10 mm, although it is possible to sort particles as small as 3 to 5 mm (depending on the particular equipment). XRT or DEXRT sorters can work efficiently with particles larger than about 25 mm, although particles larger than 25 mm are more likely to be composites of various material types (e.g., metal attached to plastic). XRT or DEXRT sorters therefore tend to work best on particles between about 10 mm and 25 mm, XRT and DEXRT sorters are commercially available from several equipment suppliers, including National Recovery Technologies, Inc. (Nashville, Tenn.) and Titech (Asker, Norway).

The ejected fraction (12) from the XRT or DEXRT sorter can be a mixture of plastics containing brominated flame retardants, PVC, metal pieces, circuit boards, wires, stones, glass and/or rubber. The ejected fraction (12) can also contain other materials that were incorrectly ejected due to proximity to ejected particles on the sorter belt. The ejected fraction (12) can be further processed (100) to recover and sort the metals, if desired.

After the high atomic density mixture (12) is removed by XRT or DEXRT, the remaining material (11) contains plastics as well as small amounts of rubber, wood and foam. This resulting mixture (11) is enriched in one or more of the target plastics (e.g., ABS, HIPS and/or PP). In some embodiments, the resulting mixture will have 90% by weight of the one or more target plastics. In other embodiments, additional enrichment can be used to achieve a composition of target plastics at or above 90% by weight.

The next step after XRT or DEXRT (10) in the process shown in FIG. 1 is size reduction (20) using a shredder or grinder. Such a grinder can be purchased, for example, from Vecoplan LLC (High Point, N.C.) or Zerma (Shanghai, China). In some embodiments, the size reduction step (20) creates a mixture (21) with an upper particle size below about 25 mm. This size reduction can further liberate non-plastic contaminants from plastics in addition to reducing the particle size to be more suitable for downstream processes. The size reduction step can also increase the bulk density, which may reduce transport costs. One downstream process that typically uses feeds having particle sizes below about 25 mm is the spinner (30) described below. Another downstream process that typically uses feeds having particle sizes below about 25 mm is the density sorting process (50), since smaller particles can result in a more efficient separation and enable the use of a wider variety of density sorting equipment.

After the size reduction (20) of FIG. 1, the particle mixture (21) is fed into a spinner (30) such as the equipment manufactured by Hermion B.V. (Waalwijk, Netherlands) or Herbold Meckesheim GmbH (Meckesheim, Germany). In some embodiments, the mixture (21) is fed to the spinner (30) has an upper particle size below about 25 mm. The spinner (30) operates at a high rotational speed (e.g., 3000 revolutions per minute) and has internal paddles that clean and convey the material. The material is caged in a screen containing holes that are approximately 2 to 5 mm in size. Dirt and fines can be removed from the particle mixture and leave through the screen. Residual moisture can also be removed. In addition, the high speed paddles can break up wood into small fragments that are thin enough to pass through the screen.

After the spinner (30) of FIG. 1, an air classifier (40) is used to remove foam and some small wood fragments (42) that were too large to pass through the screen in the spinner. The product after air classification (41) can be relatively clean flake including mostly plastic and rubber.

Density separation (50) is the next process step for the product after the air classifier (41) of FIG. 1. Density separation (50) can be accomplished, for example, with equipment supplied by TLT Kunststoff-Recycling Anlagenbau GmbH (Frankfurt am Main, Germany). In some embodiments, the density separation (50) is performed at a density of approximately 1.09 or 1.10, which can result in the removal of almost all remaining non-target plastics from the mixture. The elevated density can be accomplished by adding salt (e.g. NaCl or $MgSO_4$) or solid particles (e.g., calcium carbonate) to water. Additional anti-foam agents or dispersants can also be added to the water.

The higher density product (52) of FIG. 1 from the density sort (50) contains mostly non-target plastics, as well as small amounts of metal and a few target plastics that misreported into the stream. The mixture (52) should contain very little brominated plastics or PVC and can be further upgraded, used as a material for downgraded applications or incinerated for energy recovery.

The lower density product (51) of FIG. 1 from the density sort (50) contains primarily target plastics, as well as small amounts of rubber and wood. This mixture (51) can be further processed through a rinsing stage (60) to remove residual salt or particulate media. The rinsing step can include spray nozzles to rinse off salt or particulate media from the surface, or it might include a process where the flakes are agitated in water.

After the rinsing step (60) of FIG. 1, the mixture (61) can be processed through a spinner or centrifuge (70) to remove moisture, wood and fines. The spinner can be the same as described above.

The low density product (71) after the spinner or centrifuge now contains, in some embodiments, over 90% target plastics and can be ready for transport to a plastic recovery and purification plant (or conveyed to a plastic recovery and purification plant immediately following the pre-processing line).

The process described above can be modified by including additional process steps at various places in the process. For example, such processes can be added to create more valuable products or to improve the yield of target plastics.

One process that can be added to the process is a color sorting step (80). As described in US 2011089086 (WO2011047280), it is possible to reduce the content of heavy metals such as Cd in products from ESR by color sorting to remove red, orange, yellow, green and/or brown flakes. This color sorting step can be performed either just prior to the density separation step (50) or after the final drying/cleaning step with the spinner or centrifuge (70). If before the density separation (50), the content of Cd can be reduced in both "lights" (51) and "heavies" (52) products from the density separation (50). If after the final spinner (70), only the dried "lights" stream (71) will have been processed to reduce the content of heavy metals.

Color sorting on particles smaller than 25 mm can be accomplished with a belt color sorter, for example. It is possible to use a bichromatic color sorter as sold by Buhler Sortex (Stockton, Calif.) for example. Trichromatic or full color sorters, as manufactured by Satake USA (Stafford, Tex.) can also be used.

After the red, orange, yellow, green and/or brown colored flakes are sorted out, the yield can be improved by sorting (90) using X-Ray Fluorescence (XRF) of the sidestream (82) containing the colored flakes. Only a portion of the colored flakes contain high levels of heavy metals (e.g., flakes from products manufactured prior to the phasing out of the heavy metal-based pigments in plastics). XRF sorting, since it is able to detect and eject particles containing heavy metals, can eject a portion of the flakes highest in heavy metals (92). The remainder of the flakes (91), which do not contain heavy metals at high levels, can be returned to the main product stream (1000).

Instead of color sorting, it may also be possible to sort the entire stream (at either of the locations described above) using an XRF sorter. Such sorters are available, for example, from BT-Wolfgang Binder GmbH (Gleisdorf, Austria) or Steinert Elektromagnetbau GmbH (Cologne, Germany).

Other embodiments of the separation process are also possible. An embodiment which minimizes capital equipment costs is summarized in FIG. 2.

Figure 2:
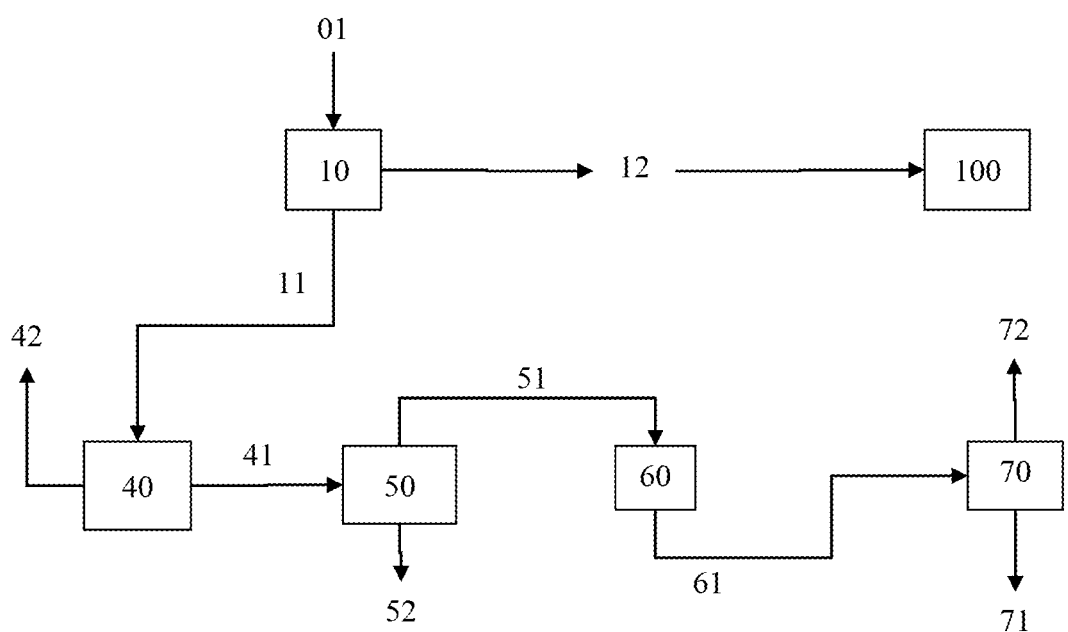
FIG. 2 shows a process to create a highly enriched stream of PP, ABS and PS

In the process shown in FIG. 2, the first step is to process the ESR material through the XRT or DEXRT sorter (10). The ejected fraction (12) can be further processed (100) to recover and sort the metals, if desired.

The remaining material (11) after the XRT or DEXRT sort (10) is next processed using an air classifier (40) to remove foam and some small wood fragments (42). The product after air classification (41) should include mostly plastic and rubber. It will likely contain higher levels of wood and surface dirt compared with the similar product using the process of FIG. 1.

The product after the air classifier (41) is processed using density separation (50). The density separation (50) is performed at a density of approximately 1.09 or 1.10, resulting in the removal of almost all remaining non-target plastics from the mixture. The efficiency of the density separation may be slightly worse than in the process of FIG. 1, though, since the mixture will have a broader particle size distribution and slightly larger particle size because there is no size reduction step.

The lower density product mixture (51) is further processed through a rinsing stage (60) to remove residual salt or particulate media. After the rinsing step (60), the mixture (61) is processed through a spinner or centrifuge (70) to remove moisture, wood and fines. The slightly larger particle size of the product in the process of FIG. 2 may lead to slightly higher wear in the spinner or centrifuge.

The product (71) from the spinner or centrifuge (70) can be the end product to be further processed at the plastics recovery and purification facility. Additional processes such as color sorting (80) can also be included for the reasons described earlier for the process of FIG. 1.

Figure 3:
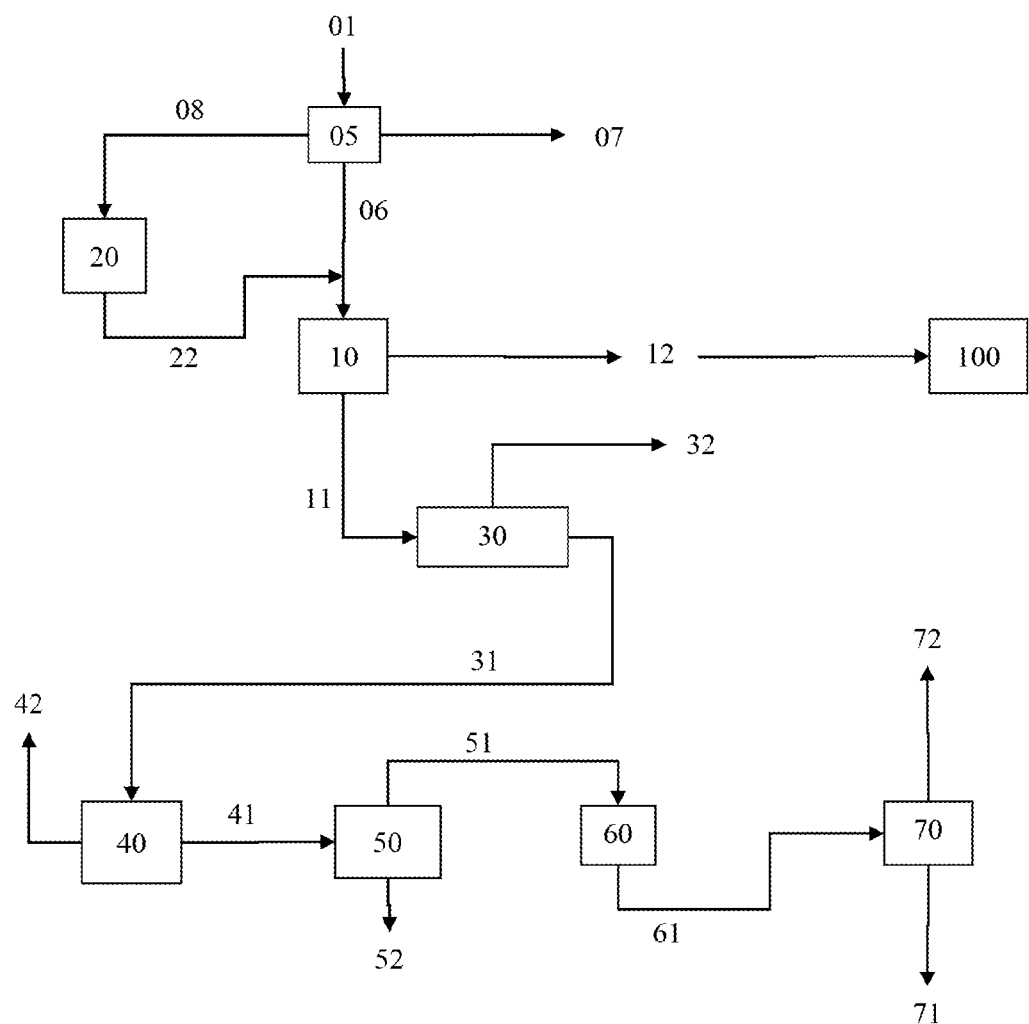
FIG. 3 shows a process to create a highly enriched stream of PP, ABS and PS

Yet another embodiment of the separation process is summarized in FIG. 3. In this embodiment, the first stage is to screen the material into a fraction larger than about 25 mm (08), a fraction smaller than 3 to 5 mm (07) and a fraction between about 3 to 5 mm and about 25 mm (06).

The fraction larger than about 25 mm (08) is reduced in size using a shredder or grinder (20). This size reduction step also has the advantage (compared with the process of FIG. 1) of liberating metal pieces from plastics.

The size reduced mixture (22) and the fraction between about 3 to 5 mm and about 25 mm (06) are combined and processed over the XRT or DEXRT (10). The ejected fraction (12) can be further processed (100) to recover and sort the metals, if desired.

The remaining material (11) after the XRT or DEXRT sort (10) is next processed through a spinner (30). Dirt and fines are removed from the particle mixture and leave through the screen. Residual moisture is also removed. In addition, the high speed paddles can break up wood into small fragments that are thin enough to pass through the screen.

After the spinner (30), an air classifier (40) is used to remove foam and some small wood fragments (42) that were too large to pass through the screen in the spinner. The product after air classification (41) can be rather clean flake including mostly plastic and rubber.

The product after the air classifier (41) is processed using density separation (50). The density separation (50) is performed at a density of approximately 1.09 or 1.10, resulting in the removal of almost all remaining non-target plastics from the mixture.

The lower density product mixture (51) is further processed through a rinsing stage (60) to remove residual salt or particulate media. After the rinsing step (60), the mixture (61) is processed through a spinner or centrifuge (70) to remove moisture, wood and fines.

The product (71) from the spinner or centrifuge (70) can be the end product to be further processed at the plastics recovery and purification facility. Additional processes such as color sorting (80) can also be included for the reasons described earlier for the process of FIG. 1.

Additional process combinations employing processes of the three embodiments described above can be implemented to create desirable products. The process steps might also be rearranged slightly while maintaining the desired results. In addition, some additional processes such as screening, air classification or others well known in the recycling industry can be used.

The various process sequences described above include several advantages, including the isolation of plastics containing brominated flame retardants into a single stream (12), the reduction of bromine levels in the final products to be lower than with density alone, the reduction of bromine levels in the mix of the majority of non-target plastics compared with sorting by density alone, and the removal of heavy metal (primarily Cd) containing plastics to a concentrated stream.

The isolation of plastics containing brominated flame retardants into a single stream is of value because such streams have limited disposal options due to the high content of bromine and antimony (present as antimony trioxide which is commonly used along with brominated flame retardants). If present in a larger volume stream, disposal costs may be much higher since the bromine level of the larger volume stream is likely to exceed thresholds that might enable disposal at favorable values. The high Sb content might also enable the sale of this mixture at a good price.

The Br content in finished products should also be much lower than when sorting based on density alone. Some plastic flakes containing brominated flame retardants do not have densities much higher than target plastics, or report with target plastics due to inefficiencies of the density separation. When DEXRT or XRT is included as part of the separation process, though, there is a better chance that almost all of the plastics containing Br are removed from the mixture of target plastics. This should enable the plastic separation plant downstream of the pre-processing plant to easily meet some customers' low halogen requirements (frequently 1000 ppm Br, which roughly corresponds to 1% plastics containing bromine).

The Br and Sb content of "heavies" from the density separation process (52) should be much lower than if only density separation is used. This could enable more options for handling this stream, including upgrading the stream to recover additional purified materials such as PC/ABS, selling the material for downgraded applications incinerating the mixture for energy recovery.

The optional additional color sorting and XRF sorting to remove heavy metal containing plastics into a concentrated stream will result in a better yield of target plastics because less colored plastic with low levels of heavy metals will be lost. This process should also allow us to create products with heavy metal concentrations well below the RoHS limit.

The early removal of plastics containing brominated flame retardants from the process will reduce the amount of material fed to the remainder of the process, which can remove bottlenecks and result in a higher plant throughput.

Figure 4:
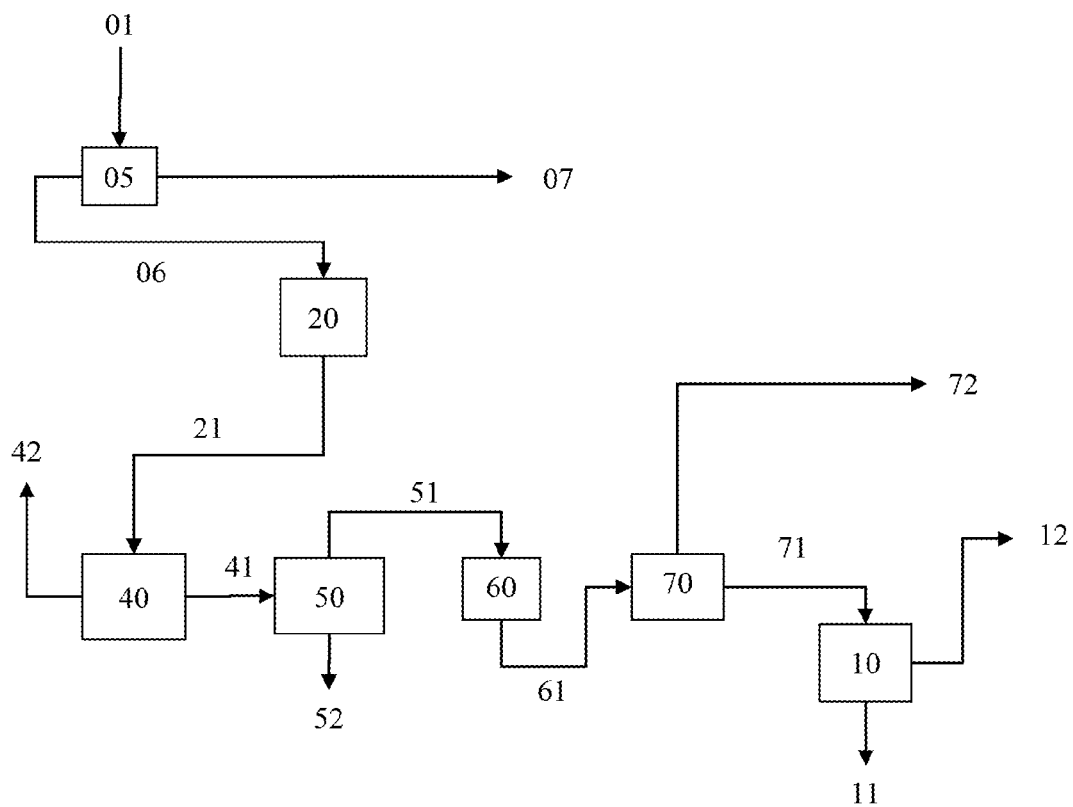
FIG. 4 shows a process to create a highly enriched stream of PP, ABS and PS

Other embodiments of the separation process are also possible. As shown in FIG. 4, it is possible to use the XRT or DEXRT sorter (10) after the density separation step (50). In this embodiment, the first stage is to screen the material (05) into a fraction larger than 3 to 5 mm (06) and a fraction smaller than 3 to 5 mm (07).

The fraction larger than 3 to 5 mm (06) in FIG. 4 is reduced in size using a shredder or grinder (20). The size reduction step (20) can reduce the upper particle size to between about 20 and 30 mm, for example. This size reduction step also has the advantage (compared with the process of FIG. 1) of liberating metal pieces and light materials (e.g., foam) from plastics.

The size reduced mixture (21) in FIG. 4 is next processed through an air classifier (40) to remove foam and some small wood fragments (42).

The product after the air classifier (41) in FIG. 4 is processed using density separation (50). The density separation (50) is performed at a density of approximately 1.09 or 1.10, resulting in the removal of almost all metals, non-target plastics and other high density materials (e.g., glass) from the mixture.

The lower density product mixture (51) in FIG. 4 contains mostly target plastics (e.g., ABS, HIPS and/or PP), but can also contain small amounts of non-plastics (e.g., rubber), metals, non-target plastics and other high density materials (e.g., glass).

The higher density product (52) in FIG. 4 is a complex mixture of metals, non-target plastics, high density plastics, and target plastics (e.g., ABS, HIPS and/or PP) that misreported to this stream. The higher density product (52) can be further processed to create higher value streams, if desired.

The lower density product mixture (51) in FIG. 4 is further processed through a rinsing stage (60) to remove residual salt or particulate media. After the rinsing step (60), the mixture (61) is processed through a spinner or centrifuge (70) to remove moisture, wood and fines.

The product (71) from the spinner or centrifuge (70) in FIG. 4 can be further processed over the XRT or DEXRT (10). The target plastic (e.g., ABS, HIPS and/or PP) product (11) in FIG. 4 can be the end product to be further processed at the plastics recovery and purification facility.

The ejected product (12) in FIG. 4 can be enriched in Br. The total amount of the stream (12) will be smaller than the ejected stream created using embodiments summarized in FIGS. 1-3, though, since much of the Br-containing plastics are removed to stream (52) by the density separation process (50) in FIG. 4.

The sequence of processes shown in FIG. 4 can be modified by adding processes of the three embodiments described above to create desirable products. The process steps might also be rearranged slightly while maintaining the desired results. In addition, some additional processes such as screening, air classification or others well known in the recycling industry can be used.

The process sequence in FIG. 4 includes several advantages, including the reduction of bromine levels in the final products to be lower than with density alone, the concentration of metals and most non-target plastics into a single stream, and/or the creation of a small stream highly concentrated in brominated plastics.

The Br content in finished products can also be much lower than when sorting based on density alone. Some plastic flakes containing brominated flame retardants do not have densities much higher than target plastics, or report with target plastics due to inefficiencies of the density separation. When DEXRT or XRT is included as part of the separation process, though, there is a better chance that almost all of the plastics containing Br are removed from the mixture of target plastics. This should enable the plastic separation plant downstream of the pre-processing plant to easily meet some customers' low halogen requirements (frequently 1000 ppm Br, which roughly corresponds to 1% plastics containing bromine).

The invention claimed is:

1. A method for separating a mixture of solid materials, the method comprising:
   screening a mixture of solid materials into at least a first fraction and a second fraction based on particle size, where the mixture of solid materials is a plastic-rich mixture recovered from waste electrical and electronic equipment, the first fraction comprising particles having particle sizes of below about 25 mm, the second fraction comprising particles having particle sizes greater than the first fraction;

sorting the first fraction based on differences in X-Ray transmission of different materials to form a third fraction and an ejected fraction, the ejected fraction comprising a majority of plastics that contain brominated flame retardants from the mixture; and density sorting at an elevated density the third fraction into a high-density fraction and a low-density product fraction, the low-density product fraction comprising 90 percent or greater (by weight) of ABS, HIPS and PP.

2. The process of claim 1, where the mixture of solid materials includes plastics that contain brominated flame retardants.

3. The process of claim 1, where the mixture of solid materials includes one or more categories of circuit boards, metals or wires.

4. The process of claim 1, where a XRT or DEXRT sorter is used to remove the majority of plastics that contain brominated flame retardants from the mixture.

5. The process of claim 1, where density sorting is performed at a density of between 1.05 and 1.10.

6. The process of claim 1, further comprising a screening step to remove particles smaller than about 3 to 5 mm prior to the sorting step based on differences in X-Ray transmission of different materials.

7. The process of claim 6, wherein screening the mixture further produces a fourth fraction comprising particles smaller than about 3 to 5 mm.

8. The process of claim 1, further comprising an air classification step prior to the density separation step.

9. The process of claim 1, further comprising a size reduction step prior to the density separation step.

10. The process of claim 9, wherein the size reduction step is prior to the screening of the mixture.

11. The process of claim 1, further comprising a spinner prior to the density separation step.

12. The process of claim 1, further comprising a spinner or centrifuge after the density separation step.

13. The process of claim 1, further comprising color sorting.

14. The process of claim 13, where color sorting is used to reduce the content of heavy metals in the end product.

15. The process of claim 14, wherein the product is color sorted after the sorting of the low-density fraction step based on differences in X-Ray transmission.

16. The process of claim 1, wherein the high-density fraction is further upgraded or incinerated for energy recovery.

17. A method for separating a mixture of solid materials, the method comprising:

reducing a size of particles of material recovered from waste electrical and electronic equipment to form a mixture of solid materials having particle of 25 mm or less;

sorting the mixture of solid materials based on differences in X-Ray transmission of different materials to form a first fraction and an ejected fraction, the ejected fraction comprising a majority of plastics that contain brominated flame retardants from the mixture; and density sorting the first fraction into a high-density fraction and a product fraction, the product fraction comprising 90 percent or greater (by weight) of ABS, HIPS and PP, where density sorting is performed at a density of between 1.05 and 1.10.

18. The process of claim 17, further comprising an air classification step prior to the density separation step.

19. The process of claim 17, further comprising a size reduction step prior to the density separation step.

20. The process of claim 17, further comprising a spinner prior to the density separation step.

* * * * *